(12) United States Patent
Nikols et al.

(10) Patent No.: US 6,671,688 B1
(45) Date of Patent: Dec. 30, 2003

(54) VIRTUAL REPLICATION FOR A COMPUTER DIRECTORY SYSTEM

(75) Inventors: Nick N. Nikols, Draper, UT (US); Brent W. Thurgood, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/501,873

(22) Filed: Feb. 10, 2000

(51) Int. Cl.$^7$ ............................................. G06F 17/30
(52) U.S. Cl. .......................... 707/10; 707/103; 703/27
(58) Field of Search ..................... 703/14, 23; 709/219, 709/230, 245; 707/10, 104, 103

(56) References Cited

U.S. PATENT DOCUMENTS

| | | | | |
|---|---|---|---|---|
| 5,860,073 A | | 1/1999 | Ferrel et al. ................. | 707/522 |
| 5,968,121 A | * | 10/1999 | Logan et al. ................ | 709/219 |
| 6,081,900 A | * | 6/2000 | Subramaniam et al. ..... | 713/201 |
| 6,178,529 B1 | * | 1/2001 | Short et al. .................... | 714/51 |
| 6,360,331 B2 | * | 3/2002 | Vert et al. ........................ | 714/4 |
| 6,516,325 B1 | * | 2/2003 | Blanchard et al. ........ | 707/104.1 |

OTHER PUBLICATIONS

U.S. patent application Ser. No. 09/470,945, filed Dec. 22, 1999, entitled: Nikols, et al., Computer Directory System Having an Application Integrated Driver Infrastructure by Nick Nikols and Daniel Rapp, copy of first page of specification, abstract and figure No. one.

U.S. patent application Ser. No. 60/165,697, filed Nov. 16, 1999, entitled: Virtual Partition Vector for a Computer Directory System by Blanchard Perin and Daniel Rapp, copy of first page of specification, abstract and figure No. one.

* cited by examiner

*Primary Examiner*—Krisna Lim
*Assistant Examiner*—T. Phan
(74) *Attorney, Agent, or Firm*—Haynes and Boone, LLP

(57) ABSTRACT

An improved system, method and software program is provided for facilitating the use of components running in a computer network. The improvement provides virtual replication of a distributed directory in a computer system. The system includes at least two servers, each including a processor connected to a network for store, among other things, a partition of information. The partition may be distributed across the network. The memory of the second server can store, among other things, a virtual replica of the partition. The virtual replica includes a filtered view, or subset, of the information in the partition.

20 Claims, 2 Drawing Sheets

VIRTUAL REPLICATION FOR A COMPUTER DIRECTORY SYSTEM

BACKGROUND SECTION

This invention relates generally to computers and computer software, and more specifically to a virtual replication system and method for a distributed data network.

Personal computers or workstations may be linked in a computer network to facilitate the sharing of data, applications, files, and other resources. One common type of computer network is a client/server network, where some computers act as servers and others as clients. In a client/server network, the sharing of resources is accomplished through the use of one or more servers. Each server includes a processing unit that is dedicated to managing centralized resources and to sharing these resources with other servers and/or various personal computers and workstations, which are known as the "clients" of the server.

Directories and directory services are often provided to enable a digital environment for a particular resource. One example of a directory service is Novell Directory Services ("NDS") for Novell Netware networks, as provided by Novell, Inc. of Provo, Utah. NDS provides a logical tree-structure view of all resources on the network so that clients can access them without knowing where they are physically located. For a given resource, an entry is made in a directory such as NDS. Specific entries of a directory are only available by directly accessing the directory.

Typically, applications operate against a single, non-distributed directory to access information that is pertinent to the application. In this manner the application can access all of the information it needs from this single source. From an administrative perspective, this presents a problem since the information is stored on an application by application basis and the administrator is forced to often manage duplicate sets of data stored in multiple locations To solve this administrative problem, distributed directory environments such as NDS, have been developed to allow for the partitioning of the data into sets that given applications may be interested in, then distributing copies of these sets to where these applications can locally access them. The separate copies, or Replicas, are kept current through an automated process called Replication. In this manner administrators can place specific information where it is most needed, yet are still able to centrally manage this information.

However, distribution of this data brings its own set of problems. For instance, if the set of information that is of interest to a given application spans the entire distributed network, the application would have to either maintain a local replica of all of the sets of data in the network or would be forced to remotely access replicas of the sets of data that do not reside locally. Either solution is undesirable. Maintaining a local replica of all of the data sets would require a lot more storage capacity and network bandwidth, and much of the data that would be stored and replicated would not be of interest to the application. Remotely accessing nonlocal sets of data would be slow and there would be a chance that the application may not be able to access all of the data it needs all of the time.

It is desired to have a distributed directory maintained such that multiple applications could use it as though they were working on a single, centralized directory.

It is also desired to be able to filter out subsets of data from a given replica in order to allow for the storage of only the data that is of interest to a given application and to reduce the amount of network traffic caused by replication events in a distributed data environment.

Summary

In response to these and other problems, an improved system, method and software program is provided for facilitating the use of components running in a computer network. To this end, the improvement provides virtual replication of a distributed directory in a computer system. The system includes at least two servers, each including a processor connected to a network for executing computer code, and a memory system. The memory of the first server can store, among other things, a partition of information. In some embodiments, the partition may be distributed across the network. The memory of the second server can store, among other things, a virtual replica of the partition. The virtual replica includes a filtered view, or subset, of the information in the partition.

In some embodiments, the virtual replica provides an application using the second server with a centralized copy of specific information from the directory in which the application is interested (the filtered view). The application can then access all of the information that it needs via a local read to the second server. Also, with certain replication technology, such as is found in NDS directories, the virtual replica can be dynamically updated as modifications are made elsewhere in the directory.

In some embodiments, the second server also includes an inbound replication software process for receiving events from the partition and then filtering the events according to the filtered view.

In some embodiments, the first server includes an outbound replication software process for filtering events from the partition and transferring the filtered events to the virtual replica.

An advantage of the present invention is that most of the difficulties that arise when applications have to access a distributed directory are reduced and/or eliminated.

Other advantages can be readily seen by further examination of the attached figures and the following description.

DESCRIPTION OF EMBODIMENTS

The present invention provides a unique system and method that bridges the gap between the benefits of having a distributed, replicated data store and the benefits of having a centralized data store. It is understood that the following disclosure provides many different embodiments, or examples, for implementing different features of this invention. Techniques and requirements that are only specific to certain embodiments should not be imported into other embodiments. Also, specific examples of networks, components, and formats are described below to simplify the present disclosure. These are, of course, merely examples and are not intended to limit the invention from that described in the claims.

Figure 1:
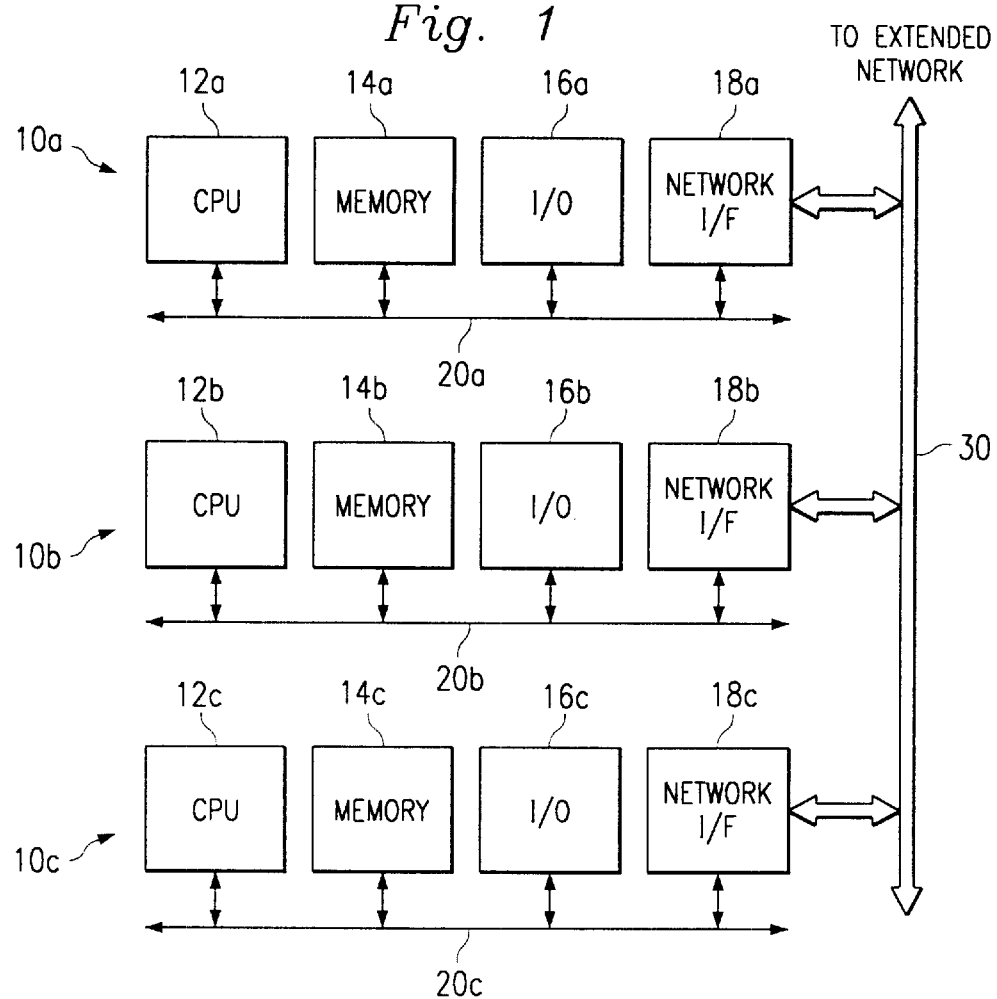
FIG. 1 illustrates a simplified computer system including three computers and a network, the system being used for implementing one embodiment of the present invention.

Referring now to FIG. 1, three similar computers, designated 10a, 10b, and 10c, are illustrated as a representative example of an operating environment for the present invention. Each computer 10a, 10b, 10c includes a central processing unit ("cpu") 12a, 12b, 12c, a memory unit 14a, 14b, 14c, an input/output ("I/O") device 16a, 16b, 16c, and a network interface 18a, 18b, 18c, respectively. The components 12a, 14a, 16a, and 18a are interconnected by a bus system 20a, the components 12b, 14b, 16b, and 18b are interconnected by a bus system 20b, and the components 12c, 14c, 16c, and 18c are interconnected by a bus system 20c. It is understood that each of the listed components may actually represent several different components. For example, the cpu 12a may actually represent a multi-processor or a distributed processing system; the memory unit 14b may include different levels of cache memory, main memory, hard disks, and remote storage locations; and the I/O device 16c may include monitors, keyboards, and the like.

The computers 10a, 10b, 10c are also commonly connected to a network 30. The network 30 may be representative of several networks, such as a local area network, a company wide intranet, and/or the internet. Because the computers 10a, 10b, 10c are connected to the network 30, certain components may, at times, be shared between the computers. Therefore, a wide range of flexibility is anticipated in the configurations of the computers. Furthermore, it is understood that, in many implementations, the computers 10a, 10b, 10c may be configured differently from each other, may have different components, and/or one computer may act as a server to the other computer.

The present invention facilitates many different operational scenarios of the computers 10a, 10b, 10c and the network 30. Single server environments and multi-server environments, as well as distributed and non-distributed environments, may benefit from the present invention. A distributed, multi-server environment will be discussed below to provide just one example of how the present invention operates.

Figure 2:
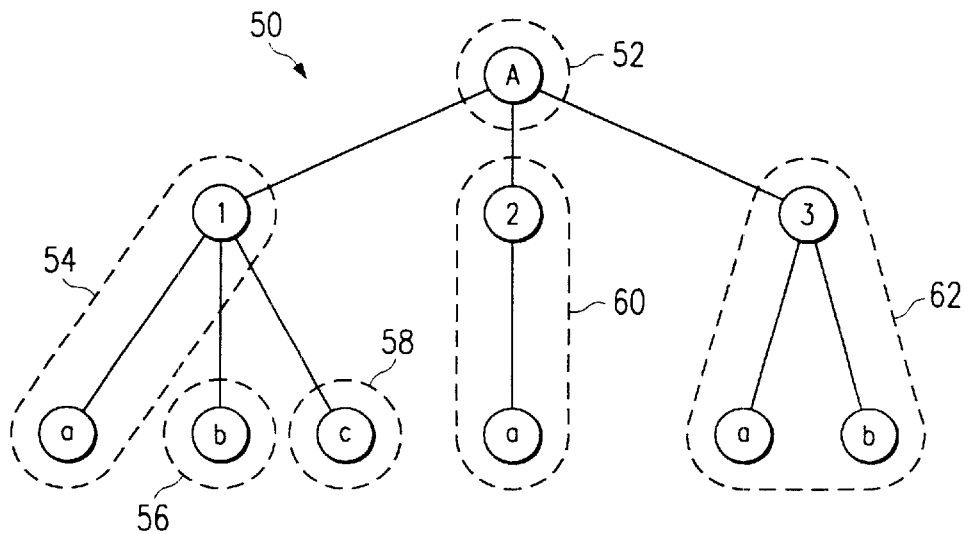
FIG. 2 is a diagram of an exemplary distributed directory system used in the computer system of FIG. 1.

Referring now to FIG. 2, the computers 10a, 10b, 10c and the network 30 are used to provide a hierarchical distributed directory system 50. Software running on one or more of the computers 10a, 10b, 10c provides the directory service, while applications running on these computers (or other computers) utilize the directory service. The software may be stored on a recordable medium, such as one or both of the memory units 14a, 14b, 14c the network 30, or other medium. Reference to the directory 50 includes the hierarchical directory (the tree structure) itself and the software running to implement and maintain the directory.

For the sake of example, the directory 50 is a NDS having a logical "tree-structure" view of all resources on the network. As a result, the computers 10a, 10b, 10c can access the resources without knowing where the resources are physically located (be it computer 10a, computer 10b, computer 10c, the network 30, or some other entity). For the sake of example, the directory 50 uses an online directory service protocol called LDAP, or Lightweight Directory Access Protocol. The directory includes one or more entries, each of which is a collection of attributes with a unique identifier.

In the present example, the directory 50 is broken into exclusive, non-overlapping "containers." A top level container A is connected to different lower containers 1, 2, 3, which are then connected to even lower containers a, b, c, etc. In furtherance of the present example, the top level container A may represent the overall directory structure for a large company; the containers 1, 2, 3 represent various cities that the company is located; and the lowest containers a, b, c represent different entities of the company, e.g., container a is for sales, container b is for marketing, and container c is for engineering. By combining the container names for more definite reference, sales 1a, 2a, 3a is in every city, marketing 1b, 3b is in two cities, and engineering 1c is only in one city.

One or more contiguous containers can be grouped into a single partition. A partition is a logical construct that is not limited to a single physical location. In the present example, container A is in a partition 52; containers 1 and 1a are in a partition 54; container 1b is in a partition 56; containers 1c is in a partition 58; containers 2 and 2a are in a partition 60; and containers 3, 3a, and 3b are in a partition 62.

A computer, such as the computer 10a, can be configured as a server for storing a replica of one or more partitions. Although replicas may be stored in one or more servers, any changes to data in a replica will replicate to the other servers storing the same data.

A problem arises when an application running in one or more of the computers 10a, 10b, 10c needs to get information from everywhere in the tree, i.e., a central "view" of the tree, and not just the local partition. The traditional solution is to "walk the tree" by going from partition to partition, bouncing from server to server. When the application requests information that is not resident on a specific server to which it is currently attached, the application gets referred to a different server that (potentially) holds the desired information. Walking the tree can be a very long and tedious process, bogging down various computers in the distributed network. Distributed network systems are often undesirable because it is difficult to get a central view of the network tree.

One solution is to allow a user to define a "view" of specific information. A view is defined by a "filter set" and a "partition scope." A filter set is an enumerated set of classes and attributes in which the particular application is interested. The partition scope is a set of partitions that hold the specific information. The partition scope can include any number of partitions. For example, a user may select user objects consisting only of a first name, last name, and telephone number of each person in the company A. The user may also define a partition scope by identifying specific partitions to view, in this example, the user is looking for marketing, so the user identifies partitions 56 and 62. Once the user has defined a filter set and a partition scope, a filtered view is stored on a specified server by setting up a virtual replica for each of the partitions specified in the partition scope. Therefore, the server has a filtered copy of every selected partition. In this way, the selected server does not have to replicate and store large amounts of data that the application does not want. This aggregates a centralized view across an entire distributed network.

The virtual replicas provide the application with a centralized copy of only the specific information from the directory that is of interest to the application. The application can then access all of the information that it needs via a local read to the given server, thereby eliminating the need to remotely walk the tree. Also, with certain replication technology, such as is found in NDS directories, the generated "view" is dynamically updated as modifications are made elsewhere in the directory.

The creation of a view may utilize one or more of the following items:

A New Virtual Replica Type

Directory systems typically have various "types" of partitions and replicas. In some embodiments of the present invention, a new type of replica is created to accommodate virtual replicas. The virtual replica type indicates that the replica only contains the information that is allowed by the replication filters. There are two version of this new type replica: read/write, and read only. (In NDS, these versions are similar to the existing "secondary replica" types.) A read/write replica is a writeable replica that can be updated from the client. A read-only replica can not be changed from the client. Instead, it will only be updated from another read/write replica (or a master replica).

An Inbound Replication Filter

A server storing a virtual replica may have an inbound replication filter. An inbound replication filter enumerates the classes and attributes to be stored on the server. These classes and attributes are determined by an application (or set of applications) that utilizes the server, such as a client to the server. This filter is defined on a server-by-server basis, and its definition resides on the server to which it applies. In the embodiment described in FIG. 2, the directory 50 uses a replication process which is modified to enforce the inbound replication filter for replicas of the virtual type. All local modifications, as well as inbound replication events, are screened through the filter to determine if those events are changes for the virtual replica(s)

An Outbound Replication Process

An outbound replication process enumerates the classes and attributes that a particular partition administrator will allow to be replicated to a server holding virtual replicas (the virtual replica server). The outbound replication process uses an outbound replication filter, residing on a server other than the virtual replica server (a source server), that is defined on a partition by partition basis. This allows the administrator to restrict the flow of information to the virtual replica server. The outbound replication process thereby "enforces" the outbound replication filter. This outbound replication filter is checked before the outbound replication process applies the virtual replica server's inbound replication filter.

In some embodiments, the source server enforces the outbound replication process only if the virtual replica server has specified that it holds a virtual replica of that partition. In this way, the events from the outbound replication process are of the appropriate size and content, and are limited to the information that the virtual replica server desires.

Changes to Object Resolution

Methods used for object resolution may be modified to allow for the specification of whether the resolution should be made to a full replica or a virtual replica. It may be necessary to make this distinction so that applications that require a full view of all objects and attributes in a given partition can be guaranteed to still resolve to a full replica. However, if an application would like to operate against a customized "view," it can specify that it would like to resolve to a virtual replica that holds that view.

So in the present embodiment, there is a process in the directory 50 that handles replication. The process provides a limited "view" of one or more partitions in the directory using a virtual replica "type." The process may also include two processes: one that issues outbound replication events, and one that receives inbound replication events. The directory 50 enforces the replication filter on the inbound side to ensure that the server holding the virtual replica(s) will only store information that is allowed through the filter. The directory 50 enforces the replication filter of the virtual replica server on the outbound side of the replication process on a source server to reduce any unnecessary replication traffic.

Figure 3:
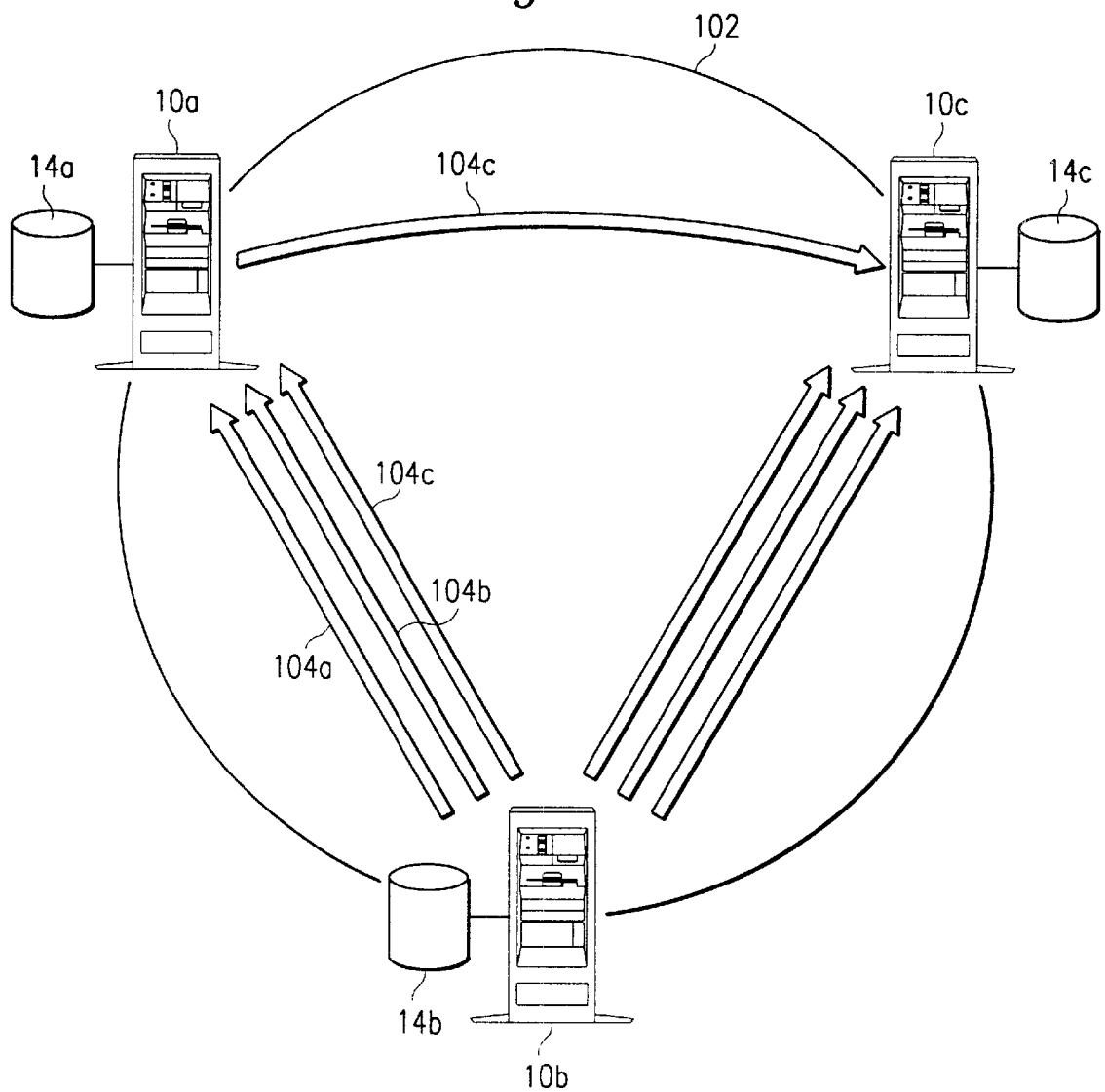
FIG. 3 is a functional description of the computer system of FIG. 1 and the distributed directory system of FIG. 2. The functional description of FIG. 3 also illustrates a routine, such as can be implemented by a software program, for implementing one embodiment of the present invention.

Referring now to FIG. 3, a flow diagram 100 provides several exemplary flow descriptions for one embodiment of a virtual replication process. The flow diagram 100 uses the three computers 10a, 10b, 10c of FIG. 1. All three computers are part of a replica ring 102. A replica ring describes a set of replicas for a given partition. The replica ring may not be an actual "ring," such as a token ring. Instead, a replica ring describes a logical grouping of replicas, so that when one entry of a replica (or the given partition) is changed in some way, the remaining replicas in the group will get updated accordingly. It is understood that in some embodiments, any computer may be able to communicate directly with any other computer.

In the present example, computers 10a and 10c are "new" servers, in that they include inbound and/or outbound replication filter capabilities, such as described above. The computer 10b is an "old" server which supports replication, but does not implement certain benefits of the present invention used for virtual replication. One advantage of the present invention is that in certain embodiments, both new and old servers are able to effectively coexist in a common directory system.

Each of the computers 10a, 10b, 10c includes a data store, represented by memories 14a, 14b, 14c, respectively. For the sake of further example, the server 10a includes a partition of data in its data store 14a. The server 10b includes a replica of that partition in its data store 14b. The server 10c includes a virtual replica of the partition in its data store 14c. The virtual replica in server 10c has a subset of the objects and/or attributes that exist in the partition at server 10a.

In the replica ring 102, whenever changes occur to any objects or attributes in a partition (or replica), those changes are replicated to the other servers in the replica ring by one or more replication events. For the sake of example, a change to the partition in server 10b may occur. The server 10b then replicates those changes by sending replication events to the destination server 10a. The replication events are represented by the three arrows 104a, 104b, 104c.

The server 10a receives the replication events 104a, 104b, 104c and makes the necessary changes to the data in its data store 14a. The server 10a then replicates the events to another destination server (this process is referred to as transitive replication). However, in the present example, the destination server 10c has specified that it holds a virtual replica of the partition. Therefore, a software administrator on the server 10a exercises an outbound replication filter process to enumerate the classes and attributes that will be replicated to the destination server 10c. In the present example, the outbound replication process in the server 10a only replicates the event 104c to the server 10c. Since the events 104a, 104b are not replicated, network traffic is reduced.

In another example, the server 10b may replicate the events 104a, 104b, 104c directly to the destination server 10c. In the present example, the server 10b does not have an outbound replication process. However, an inbound replication filter on the server 10c receives all the replication events 104a, 104b, 104c and filters out the events needed for the virtual replica. In continuance with the above example, the inbound replication filter would filter out replication events 104a, 104b and only provide replication event 104c to the virtual replica. Therefore, the new server 10c can still work directly with the old server 10b.

It is understood that modifications, changes and substitutions are intended in the foregoing disclosure and in some instances some features of the disclosure will be employed without corresponding use of other features. For example, a "new" server may only have the inbound replication filter but will not have the outbound replication process. Accordingly, it is appropriate that the appended claims be construed broadly and in a manner consistent with the scope of the disclosure.

We claim:

1. A method for replicating data in a distributed network system, the method comprising the steps of:
    determining one or more partitions to be replicated into one or more replicas, wherein each partition is a logical construct that is not limited to a single physical location, the replicas being stored on one or more servers;
    defining a view of specific information in the partitions; and
    filtering information in the partitions according to the view to create a virtual replica, the virtual replica being stored on a server (virtual replica server) different from the one or more servers;
    whereby the virtual replica has a copy of information from each partition, but does not have a copy of all the information in the partitions.

2. The method of claim 1 wherein view of specific information is determined by an application using the virtual replica server.

3. The method of claim 2 further comprising:
    providing a filter set to define the view, the filter set being an enumerated set of classes and attributes in which the application is interested.

4. The method of claim 1 further comprising the step of:
    providing an inbound replication filter for the virtual replica server so that replication events provided to the virtual replica server can be filtered appropriately.

5. The method of claim 1 further comprising the step of:
    providing an outbound replication filter process for an intermediate server connected to the virtual replica server, so that replication events to be provided to the virtual replica server through the intermediate server can be filtered beforehand.

6. An inbound replication software process for use by a first server having a virtual replica, the first server being network-connectable to a second server through a replica ring, the process being stored on a computer readable medium and comprising instructions for:
    creating a filter for information desired by an application utilizing the virtual replica;
    receiving a plurality of replication events into the first server, the replication events indicating potential changes to the virtual replica;
    screening the replication events through the filter to determine filtered events, the filtered events being a subset of the replication events; and
    implementing the changes indicated by the filtered events to the virtual replica.

7. The software process of claim 6 wherein the plurality of replication events are received from an input source local to the first server.

8. The software process of claim 6 wherein the plurality of replication events are received from the second server.

9. The software process of claim 6 wherein the filter selects specific classes of information to be used by the application.

10. The software process of claim 6 wherein the filter selects specific attributes of information to be used by the application.

11. An outbound replication software process for use by a first server being network-connectable to a second server having a virtual replica, the process being stored on a computer readable medium accessible by the first server and comprising instructions for:
    determining a subset of information applicable to the virtual replica;
    creating a filter according to the subset of information;
    receiving a plurality of replication events into the first server, the replication events including changes to data that the virtual replica replicates;
    screening the replication events through the filter to determine filtered events, the filtered events being a subset of the replication events; and
    providing the filtered events to the second server.

12. The process of claim 11 wherein the step of determining includes selecting specific classes of information to be used by an application utilizing the second server.

13. The process of claim 11 wherein the step of determining includes selecting specific attributes of information to be used by an application utilizing the second server.

14. The process of claim 11 wherein the step of determining includes selecting specific classes and attributes of information provided by the second server.

15. The process of claim 11 wherein the data is in a partition and the partition and the virtual replica are in a common replica ring.

16. The process of claim 15 wherein the first server also includes a replica in the replica ring.

17. The process of claim 11 wherein the first server includes a virtual replica with an associated input filter and the plurality of replication events are received from an input source local to the first server and filtered through the input filter.

18. A distributed computer system comprising:
    a first processor connected to a network for executing computer code;
    a second processor connected to the network for executing computer code;
    a first memory connected to the first processor for storing a partition of information, wherein the partition is a logical construct that is not limited to a single physical location;
    a second memory connected to the second processor for storing a virtual replica of the partition, the virtual replica including a subset of the information in the partition;
    a distributed directory, a portion of which being stored in the first memory and the second memory; and
    an application capable of accessing the virtual replica in the second memory, the application defining the subset of information in the virtual replica.

19. The system of claim 18 wherein the second memory also includes an inbound replication software process for receiving events from the partition in the first memory and filtering the events according to the subset of information.

20. The system of claim 18 wherein the first memory also includes an outbound replication software process for filtering events from the partition and transferring the filtered events to the virtual replica.

* * * * *